Figure 1:
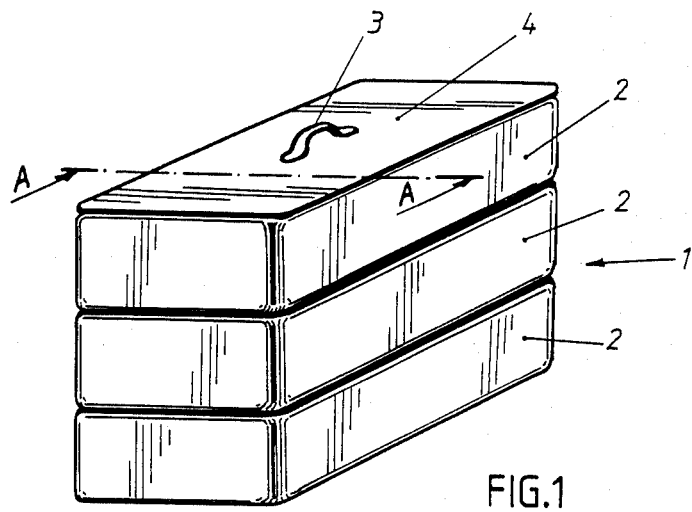

United States Patent [19]

Sarparanta

[11] Patent Number: 4,724,756
[45] Date of Patent: Feb. 16, 1988

[54] COLLAPSIBLE SMOKING BOX

[75] Inventor: Juhani Sarparanta, Vantaa, Finland

[73] Assignee: Insele Oy, Helsinki, Finland

[21] Appl. No.: 889,769

[22] Filed: Jul. 28, 1986

[30] Foreign Application Priority Data

Aug. 5, 1985 [FI] Finland .................................. 85 3006

[51] Int. Cl.$^4$ ............................................. A23B 4/04
[52] U.S. Cl. ..................... 99/482; 126/9 R; 220/4 C
[58] Field of Search ................ 99/467, 482, 481, 474, 99/475, 473, 471; 220/4 C, 4 D; 206/509; 126/9 R, 9 B, 275 R, 273 R, 25 A, 25 R, 273.5

[56] References Cited

U.S. PATENT DOCUMENTS

| 1,877,009 | 9/1932 | Mills | 220/4 D |
| 3,010,598 | 11/1961 | Foss | 220/4 C |
| 3,811,559 | 5/1974 | Carter | 220/4 D |
| 4,094,295 | 6/1978 | Boswell et al. | |
| 4,467,709 | 8/1984 | Anstedt | 99/482 |
| 4,512,249 | 4/1985 | Mentzel | 99/482 |
| 4,554,864 | 11/1985 | Smith | 99/482 |

FOREIGN PATENT DOCUMENTS 567366 8/1975 Switzerland .

Primary Examiner—Robert W. Jenkins
Attorney, Agent, or Firm—Nixon & Vanderhye

[57] ABSTRACT

The invention relates to a collapsible smoking box for smoking meat and fish in particular. The physical size of known smoking boxes is fixed and, accordingly, does not depend on the quantity of the products contained in the box to be smoked therein. Quite a large empty space of no use may be thus formed in the smoking space. In order to solve this problem, the smoking box according to the invention is formed by a plurality of separate modules to be piled up on upon another, which modules are equal in structure with the exception of the bottom of the lowest module.

13 Claims, 4 Drawing Figures

COLLAPSIBLE SMOKING BOX

The invention relates to a collapsible smoking box for smoking meat and fish in particular. The box comprises a plurality of separate modules to be piled up one upon another so that the lowest module forms a lower part which contains the smoke evolving material, and the modules positioned thereupon form a smoking space. A separate lid is provided on the box for the closing thereof in such a manner that the smoke cannot get out freely.

Known smoking boxes usually comprise a smoking space in which there are several grill racks positioned at different heigts and attached to supporting means provided on the side walls of the box, on which grill racks the products to be smoked are positioned. The physical size of the smoking boxes is fixed and, accordingly, does not depend on the quantity of the products contained in the box to be smoked therein. Quite a large empty space of no use may thus be formed inside the smoking space. In addition, this kind of smoking boxes are difficult to handle on account of their complicated structure.

Swiss Patent Specification No. 567 366 discloses a smoking device which comprises two cylindrical parts positioned one upon the other, and a lid. The upper part is at the lower end thereof provided with a flange extending around the outer surface thereof and resting on the upper surface of the lower part. The volume of this smoking device can be reduced approximately by half by removing the upper part and by placing the lid on the lower part. In spite of this limited possibility to modify the device, the physical size thereof is still large as compared with the quantity of the products contained therein. Moreover, the device is difficult to transport and handle because it is formed of large parts.

The object of the invention is to eliminate the above disadvantages and to provide a smoking box the smoking space of which is adjustable to several different volumes and which is simple in construction and easy to handle. These advantages are achieved according to the invention in such a manner that the modules, with the exception of the bottom of the lowest module, are equal in structure, each module comprising an upper collar forming an opening of the module as an extension of side walls, and each module of the smoking space comprising a lower collar as an extension of the side walls, said lower collar resting on the upper collar of a lower module.

The basic idea of the invention is thus to provide a smoking box the size of which can be adjusted simply by placing a desired number of modules one upon another. Further, the smoking box is steady and easy to handle and transport.

Figure 2:
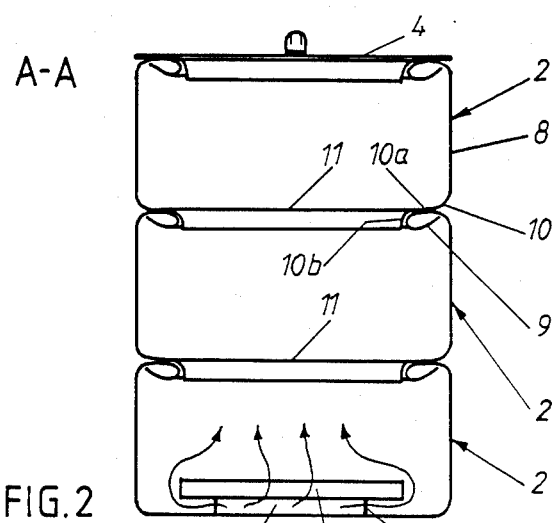
Figures 3, 4:
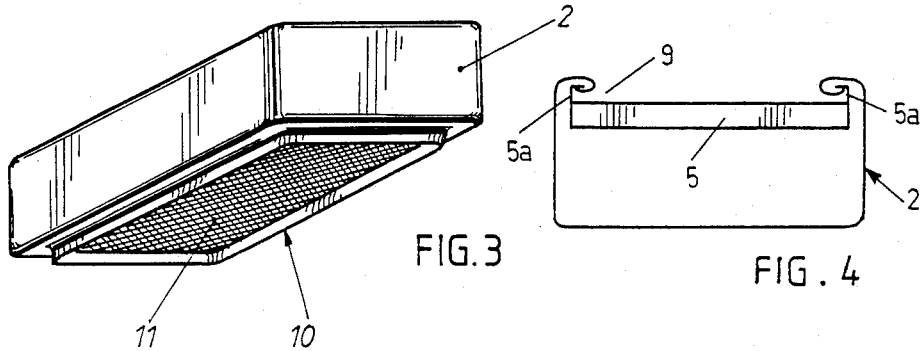

The invention will be described more closely below with reference to the attached drawing, wherein FIG. 1 illustrates a smoking box according to the invention when assembled, FIG. 2 is a cross-section in the direction of the line A—A in FIG. 1, FIG. 3 illustrates one module of the smoking box seen from below, and FIG. 4 is a cross-sectional view of the lowest module, a through positioned in the module having an alternative position.

The smoking box 1 shown in FIG. 1 is formed by three superposed modules 2 being substantially rectangular. A lid 4 provided with a carrying handle 3 is positioned on the uppermost module 2 so as to close the box in such a manner that the smoke cannot get out. The smoking box according to the invention can be advantageously manufactured of a stainless steel sheet.

FIG. 2, which is a cross-section along the line A—A of FIG. 1, illustrates more closely how the modules 2 are positioned one upon another. A trough 5 is provided at the bottom of the lowest module 2, the smoke evolving material being positioned in a hollow 7 which is formed between trough legs 6. The trough 5 is intended to gather the fat dropping from the smoking space above and to prevent the transfer of the radiation heat up to the smoking space. The trough is smaller than the bottom of the module 2 both in the direction of the length and the width thereof so that the smoke which is formed can, as shown by the arrows of FIG. 1, rise upwards between the trough and the module walls into the proper smoking space, wherein the products to be smoked are positioned. The walls 8 of each module 2 are bent inwardly at the upper portion thereof in the form of a loop, thus forming an upper collar 9 having a substantially horizontal upper surface and extending inwards from the plane of the side walls of the box, whereby the rounded edges of the upper collar define an opening of the module. The dimensions of the opening of the module are thus smaller than the outer dimensions of the module in an amount which corresponds to the dimensions of the upper collar 9. A subsequent upper module or the lid 4 is fitted in the opening. Each module, with the exception of the lowest one, is at the bottom part thereof provided with a lower collar 10 which is fitted in the opening of a lower module, being thus positioned against the upper collar 9 of said lower module. The lower collar 10 comprises a substantially horizontal portion 10a which extends inwardly from the plane of the side walls of the box and which is positioned on the horizontal portion of the upper collar 9 of a lower module, and a vertical portion 10b extending substantially in parallel with the side walls of the box, which vertical portion is fitted in the opening of the lower module. The lower collar 10 is rounded in accordance with the edges of the upper collar 9 in such a manner that the modules are positioned tightly against each other. It appears from FIG. 3 that the lower collar 10 extends around the entire module 2. The collar structure according to the invention maintains the modules steadily in place so that they are not able to move in the opening of a lower module, which at the same time provides a smoke-tight connection between the modules. The lid 4 is also provided with a corresponding lower collar 10. The bottom of each module, except the lowest one, is formed by a net 11 which is fastened in level with the horizontal portion 10a of the lower collar 10 and on which the items to be smoked are placed. The net 11 appears clearly from FIG. 3. The net can also be detachable, whereby the space between two subsequent smoking racks can be made larger by detaching the net. In order to provide more space for the smoke evolving material on the bottom of the lowest module, the upper collar of the lowest module can be utilized as shown in FIG. 4, i.e. by suspending the trough 5 from the upper collar by means of flanges 5a. In this case the trough need not to be provided with the legs 6.

Even if the invention has been described above with reference to the embodiment of the attached drawings, it is to be understood that the invention is not restricted thereto, but it can be modified within the inventive idea defined in the attached claims. Accordingly, the different modules can vary in height.

I claim:

1. A smoking box for smoking meat and fish in particular, comprising a plurality of separate modules to be piled up one upon another so that the lowest module forms a lower part containing the smoke evolving material, and the modules positioned thereupon form a smoking space, a separate lid being provided on said box for the closing thereof in a smoke-tight manner, wherein the modules, with the exception of the bottom of the lowest module, are identical in structure, each module comprising a plurality of side walls which terminate at an upper end of the module in an upper collar which extends inwardly from said side walls to define an opening in the upper end of the module, and which terminate at a lower end of the module in a lower collar which includes a horizontal portion extending inwardly from said side walls and a vertical extension which defines an opening in the lower end of the module; said extension shaped to correspond to said opening in said upper end and wherein outer dimensions of said vertical extension correspond substantially to dimensions of said upper opening so that the upper opening of each said module is adapted to receive the vertical extension of another of said modules; and wherein each module in the smoking space is provided with a net extending across the horizontal portion of said lower collar.

2. A smoking box according to claim 1, wherein a trough is suspended from the upper collar of the lowest module by means of flanges.

3. A smoking box according to claim 1, whereby it is manufactured of a stainless steel sheet.

4. A smoking box for smoking meat and fish in particular, comprising a plurality of separate modules to be piled up one upon another so that the lowest module forms a lower part containing the smoke evolving material, and the modules positioned thereupon form a smoking space, a separate lid being provided on said box for the closing thereof in a smoke-tight manner, wherein the modules, with the exception of the bottom of the lowest module, are identical in structure, each module comprising side walls which terminate at an upper end in an upper collar defining an opening in the module, and at a lower end in a lower collar, said lower collar of one module resting on the upper collar of another module, and wherein a trough is provided at the bottom of the lowest module, said trough being spaced from a bottom surface of said lowest module by means of legs.

5. A smoking box according to claim 4, wherein a hollow is formed between the legs for the smoke evolving material.

6. A smoking box for smoking meat and fish in particular, comprising a plurality of separate modules to be stacked one upon another so that the lowest module forms a lower part containing the smoke evolving material, and the modules positioned thereupon form a smoking space, a separate lid being provided on said box for the closing thereof in a smoke-tight manner, wherein the modules, with the exception of the bottom of the lowest module, are identical in structure, each module comprising side walls which are bent inwardly at upper and lower portions there of so as to form, respectively, an upper collar defining an opening of the module and respectively a lower collar resting on the upper collar of a lower module, the lowest module being provided with means for gathering fat dropping from the smoking space, and each of the modules forming the smoking space being provided with smoke permeable supporting means for receiving the items to be smoked.

7. A smoking box according to claim 6, wherein the upper collar extends substantially horizontally inwards from the plane of the side walls.

8. A smoking box according to claim 7, wherein the lower collar is formed by a substantially horizontal part and a substantially vertical extension thereof, the outer dimensions of said extension correspond to the dimensions of the opening formed by the upper collar of the module.

9. A smoking box according to claim 8, wherein the smoke permeable supporting means comprise a net fastened level with the horizontal part of the lower collar.

10. A smoking box according to claim 6, wherein the fat gathering means comprise a trough at the bottom of the lowest module, said trough being spaced from the bottom by means of legs.

11. A smoking box according to claim 10, wherein a hollow is formed between said legs for the smoke evolving material.

12. A smoking box according to claim 6, wherein the gathering means comprise a trough which is suspended from the upper collar of the lowest module by means of flanges.

13. A smoking box according to claim 6, wherein said box is manufactured of a stainless steel sheet.

* * * * *